G. D. BURTON.
Car-Couplings.

No. 155,221. Patented Sept. 22, 1874.

WITNESSES:
A. Bennemendorf
O. Sedgwick

INVENTOR:
G. D. Burton
BY
ATTORNEYS.

UNITED STATES PATENT OFFICE.

GEORGE D. BURTON, OF NEW IPSWICH, NEW HAMPSHIRE.

IMPROVEMENT IN CAR-COUPLINGS.

Specification forming part of Letters Patent No. 155,221, dated September 22, 1874; application filed July 3, 1874.

*To all whom it may concern:*

Be it known that I, GEORGE D. BURTON, of New Ipswich, in the county of Hillsborough and State of New Hampshire, have invented a new and Improved Combined Self Car Coupler and Buffer, of which the following is a specification:

The invention will first be fully described, and then pointed out in the claim.

Figure 1:
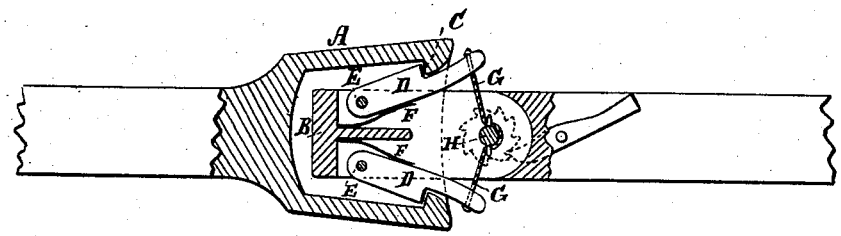
Figure 2:
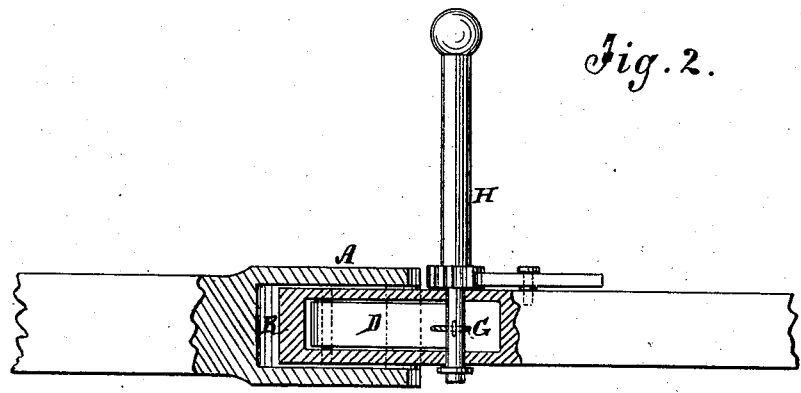

Figure 1 is a horizontal section of my improved car buffer and coupler, and Fig. 2 is a longitudinal sectional elevation.

Similar letters of reference indicate corresponding parts.

A is the socketed buffer, and B the solid-headed one for entering the socket. The former is bell-mouthed to some extent, so that the latter will enter readily for coupling self-actingly; and it has vertical shoulders C just inside of the mouth for locking the buffer B, after entering the socket, by means of the notched pawls D, which are pivoted to side recesses E just behind the head, so that the forward ends will enter freely, and have springs F to push them out as soon as the notches pass the shoulders. To unfasten the pawls they are connected, by a cord, G, with a shaft, H, extending up to the platform or to the top of the car, and arranged to turn for winding the cords on and off; and it has a ratchet and pawl for holding it fast.

This coupler may be combined with a safety-platform or not, or applied to passenger or freight cars.

Having thus described my invention, I claim as new and desire to secure by Letters Patent—

The combination of the shaft H and cord with pawls D, draw-heads B and A, and shoulders C, substantially as specified.

GEORGE D. BURTON.

Witnesses:
 WILL. A. PRESTON,
 CHAS. A. WHITNEY.